Jan. 4, 1949.  H. H. GRIMM  2,457,816

VARIABLE PERMEABILITY TUNER

Filed Feb. 27, 1945  2 Sheets-Sheet 1

INVENTOR.
HENRY H. GRIMM
BY William D. Hall
ATTORNEY

Jan. 4, 1949.  H. H. GRIMM  2,457,816
VARIABLE PERMEABILITY TUNER

Filed Feb. 27, 1945

INVENTOR.
HENRY H. GRIMM
BY *William D. Hall*
ATTORNEY

Patented Jan. 4, 1949

2,457,816

UNITED STATES PATENT OFFICE 2,457,816

VARIABLE PERMEABILITY TUNER

Henry H. Grimm, Dayton, Ohio

Application February 27, 1945, Serial No. 580,062

3 Claims. (Cl. 250—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a tuning device and more particularly to such a device for use in imparting a wide range to an oscillator or to a heterodyne frequency indicating device.

The objects of the present invention comprise the provision of an improved device for widening the tunable range in the fundamental frequency of a heterodyne oscillator; and a device of improved stability.

With the above and other objects in view that will be apparent to those who are informed in the field to which the present invention belongs from the following discussion, a suitable illustrative embodiment of the present invention is shown in the accompanying drawing wherein.

Figure 1:
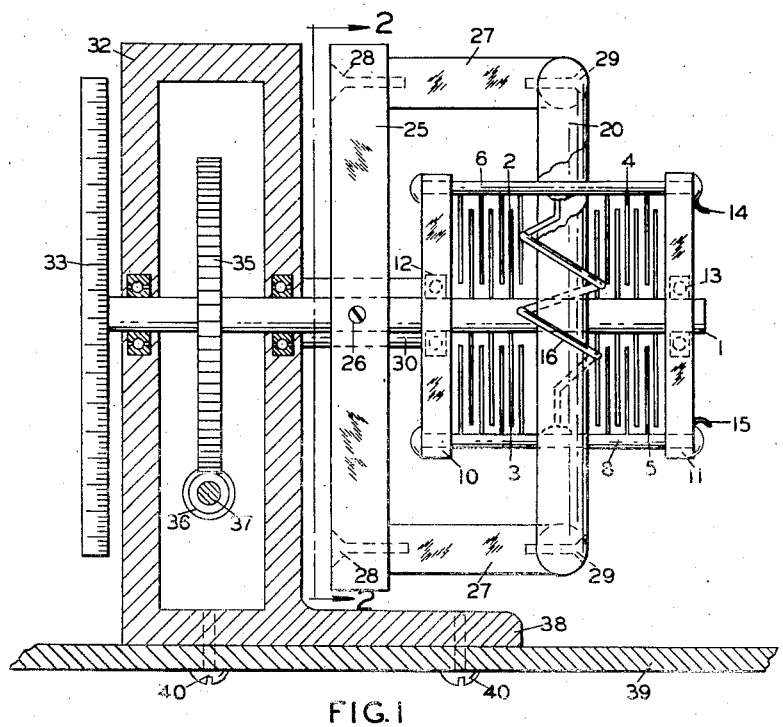
Fig. 1 is a side elevation, partly in section, of a device that embodies the present invention.
Figure 2:
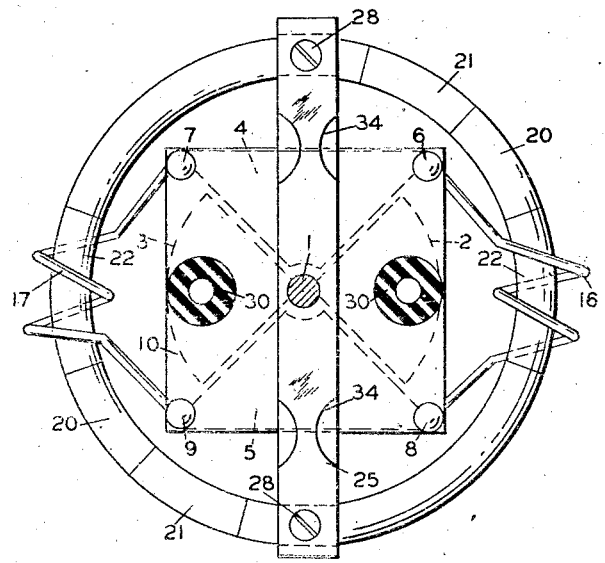
Fig. 2 is an elevational view taken from the dot and dash line 2—2 of Fig. 1.
Figure 3:
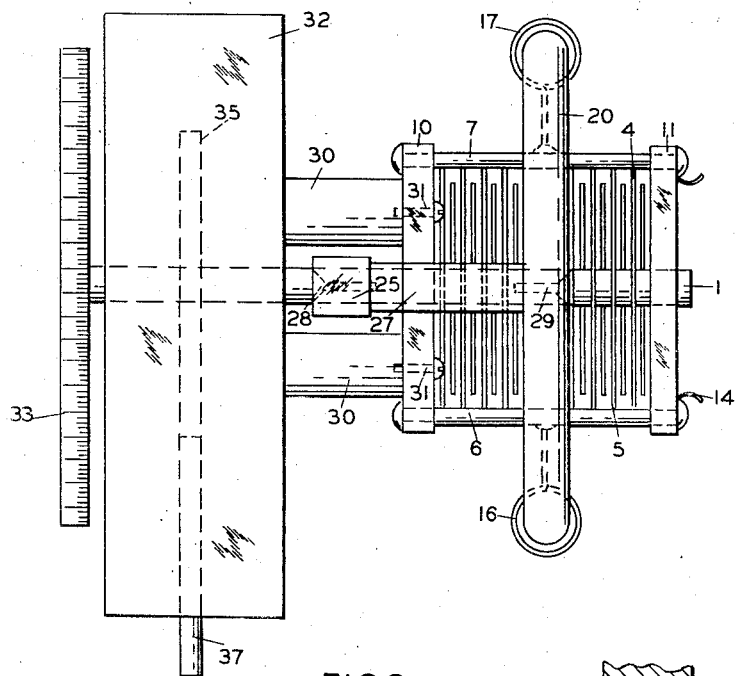
Fig. 3 is a plan view from above of the device that is shown in Fig. 1.

The tuning device that is illustrated in the accompanying drawings comprises broadly in a single piece of apparatus a variable capacitor and a variable inductor.

The capacitor part of the tuning device preferably is of the rotatable type. The illustrative capacitor shown comprises a shaft 1 that carries two diametrically opposed groups 2 and 3 of movable plates. The movable plates 2 and 3 are adapted for passing thru two groups 4 and 5 of split stator or fixed plates. The split stator plates 4 are rigidly mounted at their radially outer edges to one pair of conductive rods 6 and 7 and the split stator plates 5 are rigidly mounted at their radially outer edges to another pair of conductive rods 8 and 9. The conductive rods 6–9, inclusive, maintain the condenser split stator plates 4 and 5 accurately aligned with respect to the movable plates 2 and 3. The conductive rods 6–9 inclusive, also maintain a pair of non-conductive capacitor end walls 10 and 11 in rigidly spaced relation with respect to each other in any desired manner as by being mounted therein inwardly of the radially outer edges thereof, or the like. The capacitor end walls 10 and 11 preferably are of an insulating material, such as a ceramic, a plastic, or the like, and have the capacitor shaft 1 journalled therein and preferably on ball bearings 12 and 13, respectively, or the like. A soldering lug 14 is available on one of the conductive rods 6 or 7 for making connection with the immovable stator plate group 4 and another soldering lug 15 is provided on one of the conductive rods 8 or 9 for making a connection with the immovable stator plate group 5. The lugs 14 and 15 provide contacts for the tuning device.

The variable inductor portion of the device comprises a pair of inductors 16 and 17 of a desired plurality of turns and that are disposed upon opposite sides of the condenser assembly. The inductors 16 and 17 in parallel connect the fixed condenser plate group 4 to the fixed condenser plate group 5. The inductors 16 and 17 are adapted for being preferably permeability tuned in any desired manner, as by a segmented ring of plastic 20, powdered iron 21, brass 22, or the like. The segmented ring is disposed coaxially inwardly of the inductors 16 and 17 and is not in contact therewith.

The inductor tuning ring preferably is of insulating material, such as a plastic 20 or the like, whose permeability is approximately 1, interrupted by segments of materials that have permeability factors that differ from those of plastic, such as one or more segments 21 of powdered iron having a permeability factor that is greater than 1, and one or more segments 22 of brass having a permeability factor that is less than 1. This variety of permeability materials as parts of the inductor tuning ring provide for the adjustable permeability tuning of the tuning device as the segments of plastic 20, powdered iron 21 and brass 22 are inserted as a variable core to a greater or smaller degree into the inductors 16 and 17 by rotation of the ring of which these segments form parts.

The tuning adjustment of the ring comprising the segments 20, 21 and 22 within the pair of inductors 16 and 17 is accomplished in any desired manner and preferably by mounting it upon the capacitor shaft 1 to move therewith as shown. In the mounting that is illustrated, an inductance tuning bar 25 is fixed with respect to the capacitor shaft 1 in any desired manner, as by means of a set screw 26 or the like, and carries the inductor tuning ring comprising the segments 20, 21 and 22 by means of a plurality of spacers 27 that are attached to the bar 25 by screws 28 and to the segmented ring by screws 29.

The tuning device is supported in any desired manner as by means of a desired plurality of stand-off insulators 30, or the like, that are interposed between the insulating capacitor end wall 10 to which the insulators 30 are secured by screws 31, and a suitable support such as a side of a gear box 32 or the like. The capacitor shaft 1 preferably continues thru the gear box 32 and carries a tuning scale 33, or other suitable calibrated scale upon the exposed end thereof.

Suitable means for turning the shaft 1 is provided, such as a gear 35 that is keyed thereto and that has its peripherally disposed teeth engaged by the teeth of a pinion gear 36 or the like. The shaft 37 of the pinion gear 36 extends outwardly of the gear box 32 where a hand knob or the like, not shown, is available for the tuning of the device. The gear box 32, and a flange 38 that extends therefrom are secured to a desired panel part, such as a panel bottom 39, or the like, by suitable means, such as by the rivets 40. When so mounted the assembly is supported by the bottom 39 of a panel box. The markings on the tuning scale 33 can be observed thru a window in the panel, not shown. The shaft 37 of the pinion gear 36 extends thru the panel so that a knob, not shown, on the end of the shaft 37 that is remote from the pinion gear 36 is available for the rotation of the condenser and inductor tuning shaft 1 of the device.

Figure 5:
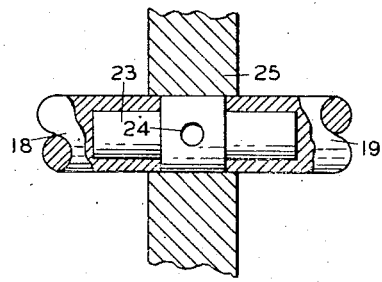
Fig. 5 is a fragmentary sectional view of an assembly comprising an insulating shaft as a part thereof.

The condenser shaft 1 may, if desired, be replaced by an insulating shaft that comprises two sections 18 and 19 that have an insulating portion 23 interposed therebetween. The insulator 23 may be disposed between the gear box 32 and the capacitor-inductor assembly, if preferred, as shown in Fig. 5 for improving the tuning efficiency of the device by removing the rotor plates 2 and 3 from the ground part of the circuit of the device. The insulation portion 23 preferably has axially extending portions non-rotatably seating in sockets in the spaced ends of the two shaft positions 18 and 19 for securing them rigidly together. The segmented shaft so provided preferably is keyed to the tuning bar 25 by a set screw or the like, that seats in an aperture 24, as in the previously described assembly.

The tuning of the device is accomplished by causing the rotation of the capacitor and inductor shaft 1 thru the operation of the pinion gear 36. The scope of the present invention is inclusive of any usual form of support for the condenser-inductor assembly in place of the stand-off insulators 30. Notches 34 may be made in the lateral edges of the inductance tuning bar 25, if desired, for engaging the insulators 30, and for avoiding the limiting of the tuning range. The calibration of the tuning of the device may be read from the tuning scale 33 in usual manner. The tuning range of the present device in oscillator service is in the nature of 4 to 1 as compared with a 2 to 1 tuning range service in preceding devices, thereby substantially doubling the tunable width of a circuit by the installation of the present device therein.

Figure 4:
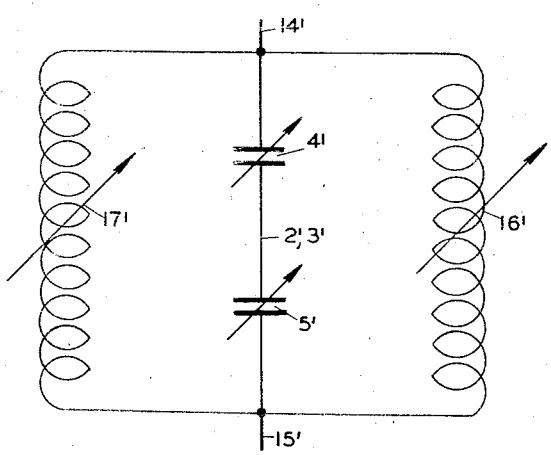
Fig. 4 is a schematic diagram of the circuit components of the device that is shown in Fig. 1.

The circuit for the present device is shown in Fig. 4 of the acompanying drawings in which the primed numerals correspond with the unprimed numerals indicating corresponding components in the other views of the drawings for ease in association therewith. In an oscillator circuit, the lugs 14 and 15 would be connected across the plate-grid terminals of the oscillator, and the capacitor rotor plate groups 2 and 3 may be grounded or ungrounded as desired.

It is to be understood that the particular constructions and the described operation of the devices that are shown in the acompanying drawings have been submitted for the purposes of illustrating and describing suitable embodiments of the present invention and that modifications and substitutions of parts and their manner of assembly may be made without departing from the present invention as defined by the appended claims.

What I claim is:

1. Radio apparatus for tuning over a wide band of resonant frequencies comprising in combination variable capacitance and inductance means mechanically and electrically coupled, said variable capacitance means comprising split stator plates and split rotor plates, the split rotor plates being dielectrically mounted with respect to said split stator plates on a rotatable shaft, said inductance means comprising a plurality of symmetrically arranged inductance coils supportively mounted on said variable capacitance means and electrically coupled with said split stator plates to be in parallel with said variable capacitance means, a yoke member secured to said rotatable shaft and rotatable in unison therewith, a resonance changing annular member mounted on said yoke member and circumferentially extending through the inductance coils axially thereof, means for rotating said shaft for circumferentially rotating said annular member with respect to the axial lengths of said coils simultaneously with the rotation of the split rotor plates.

2. Radio apparatus for tuning over a wide band of resonant frequencies comprising in combination variable capacitance and inductance means mechanically and electrically coupled, said variable capacitance means comprising split stator and split rotor plates, the said split rotor plates being dielectrically mounted with respect to said split stator plates on a rotatable shaft, said split stator plates being held in spaced relation to each other by conductive rods, said inductance means comprising an annular segmented member composed circumferentially of a plurality of segments of materials of different permeabilities, a plurality of inductance coils mechanically and electrically coupled to the conductive rods so that electrically the inductance coils are in parallel with the variable capacitance means and mechanically the inductance coils are symetrically supported about the annular member, means for circumferentially rotating said annular member through the axial length of said coils comprising a yoked member secured to said rotatable shaft, said yoked member having spaced yoke arms, said annular member being rigidly attached to the spaced yoke arms and supported in spaced relation to said variable capacitance means permitting free circumferential movement of the annular member axially of said coils.

3. A wide band radio tuning device comprising in combination variable capacitance and variable inductance means mechanically and electrically coupled, said variable inductance means including at least one inductance coil partially enclosing a segmented annular member, said segmented annular member being composed of a plurality of arcuate segments of different materials having differing magnetic permeability characteristics, means to rotate said segmented annular member circumferentially through the axial length of said inductance coil, supporting means for mounting the inductance coil symmetrically and in stationary relation with respect to said annular segmented member, said variable capacitance means having means for varying its capacitance, coupling means to couple the said means for rotating the segmented annular member to the means for varying the capacitance whereby both capacitance and inductance are varied simultaneously, means for electrically connecting the inductance coil to the variable capacitance means the said connection being made so that the variable inductance and variable capacitance are in parallel.

HENRY H. GRIMM.

REFERENCES CITED

The following references are of record in the file of this patent:

UNITED STATES PATENTS

| Number | Name | Date |
| --- | --- | --- |
| 1,545,940 | Cabot | July 14, 1925 |
| 1,659,417 | Washington | Feb. 14, 1928 |
| 1,884,011 | Lord | Oct. 25, 1932 |
| 1,936,671 | Hurt | Nov. 28, 1933 |
| 1,940,228 | Polydoroff | Dec. 19, 1933 |
| 2,037,754 | Beers | Apr. 21, 1936 |
| 2,206,820 | Mydlil | July 2, 1940 |
| 2,034,761 | Harvey | Dec. 8, 1942 |
| 2,367,681 | Karplus et al | Jan. 23, 1945 |
| 2,370,714 | Carlson | Mar. 6, 1945 |
| 2,413,836 | Larson | Jan. 7, 1947 |